United States Patent
Hornung et al.

(10) Patent No.: US 11,378,398 B2
(45) Date of Patent: Jul. 5, 2022

(54) SURVEYING DEVICE WITH AUTOMATIC TRAINING OF LOCKED OBJECT OR PERSON FOR CAMERA BASED TARGET TRACKING

(71) Applicant: LEICA GEOSYSTEMS AG, Heerbrugg (CH)

(72) Inventors: Ulrich Hornung, St. Gallen (CH); Zoltán Török, Berneck (CH); Veroljub Maksimovic, Biberist (CH); Bernhard Metzler, Dornbirn (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 0 days.

(21) Appl. No.: 16/544,768

(22) Filed: Aug. 19, 2019

(65) Prior Publication Data

US 2020/0056886 A1    Feb. 20, 2020

(30) Foreign Application Priority Data

Aug. 20, 2018   (EP) ..................................... 18189833

(51) Int. Cl.
| | | |
|---|---|---|
| *G01C 15/00* | (2006.01) | |
| *G06T 7/70* | (2017.01) | |
| *G06T 7/20* | (2017.01) | |
| *H04N 5/232* | (2006.01) | |
| *H04N 5/247* | (2006.01) | |

(52) U.S. Cl.
CPC .............. *G01C 15/008* (2013.01); *G06T 7/20* (2013.01); *G06T 7/70* (2017.01); *H04N 5/23238* (2013.01); *H04N 5/247* (2013.01); *G06T 2207/20081* (2013.01); *G06T 2207/20084* (2013.01)

(58) Field of Classification Search
CPC ........... G06T 7/70; G06T 7/20; G01C 15/008; H04N 5/23238; H04N 5/247
See application file for complete search history.

(56) References Cited

U.S. PATENT DOCUMENTS

| | | | |
|---|---|---|---|
| 8,681,317 B2 | 3/2014 | Moser et al. | |
| 2005/0089194 A1* | 4/2005 | Bell ......................... | G06T 7/70 |
| | | | 382/173 |

(Continued)

FOREIGN PATENT DOCUMENTS

| | | |
|---|---|---|
| EP | 2 141 450 A1 | 1/2010 |
| EP | 2 237 071 A1 | 10/2010 |

(Continued)

OTHER PUBLICATIONS

Extended European Search Report dated Jan. 29, 2019 as received in Application No. 18189833.9.

*Primary Examiner* — Peet Dhillon
(74) *Attorney, Agent, or Firm* — Maschoff Brennan (57) ABSTRACT

The invention generally relates to an industrial or geodetic surveying device having a tracking unit configured to receive over a tracking channel a tracking signal which is used to track a cooperative target. According to the invention, the surveying device comprises a camera to generate image data, wherein based on the additional knowledge about the position of the cooperative target in an image generated in the locked state, the visual appearance of the target carrier is learned and the result is stored in the form of a detector for use in a backup tracking mode.

14 Claims, 5 Drawing Sheets

(56) References Cited

U.S. PATENT DOCUMENTS

| | | | |
|---|---|---|---|
| 2008/0002856 A1* | 1/2008 | Ma | G06V 10/462 382/103 |
| 2010/0245587 A1* | 9/2010 | Otani | G06T 7/277 348/169 |
| 2013/0093882 A1 | 4/2013 | Kotzur et al. | |
| 2014/0105457 A1* | 4/2014 | Metzler | G06V 10/40 382/103 |
| 2016/0050397 A1* | 2/2016 | Di Giamberardino | H05B 47/11 315/149 |
| 2019/0197313 A1* | 6/2019 | Iwanaga | G06T 7/20 |

FOREIGN PATENT DOCUMENTS

| | | |
|---|---|---|
| EP | 2 405 237 A1 | 1/2012 |
| WO | 2010/148526 A1 | 12/2010 |

* cited by examiner

SURVEYING DEVICE WITH AUTOMATIC TRAINING OF LOCKED OBJECT OR PERSON FOR CAMERA BASED TARGET TRACKING

CROSS-REFERENCE TO RELATED APPLICATIONS

This application claims priority to European Patent Application No. 18189833, filed on Aug. 20, 2018. The foregoing patent application is herein incorporated by reference.

FIELD OF INVENTION

The invention relates generally to an industrial or geodetic surveying device according to the preamble of claim 1 for determining a position of a target carrier.

In surveying it is a general object to determine geometrical properties such as coordinates, distances, and orientations of one or more target objects relative to a surveying device, wherein in most instances those properties have to be determined with respect to a known reference system, e.g. defined by one or more known reference points.

BACKGROUND

Methods and systems for measuring target coordinates are used in many applications, e.g. very precise measurements in geodesic applications, measurement problems in the field of building installation, or for controlling industrial processes, wherein many structural features of the used measuring devices, e.g. total stations and industrial laser trackers, are increasingly converging today.

The basic structure of such measuring devices typically comprises an opto-electronic distance meter to determine a distance to an object based on a laser measuring beam, wherein the aiming direction of the laser measuring beam can be varied in a motorized movement, e.g. with respect to one or more independent spatial directions.

Opto-electronic laser distance meters have now become standard solutions in many areas, wherein various principles and methods are known in the field of electronic or electro-optical distance measurement.

One approach is to emit pulsed electro-magnetic radiation, e.g. laser light, to a target to be measured and to subsequently receive an echo from this target as a back-scattering object, wherein the distance to the target to be measured can be determined by the time-of-flight (ToF), the shape, and/or the phase of the pulse.

Another approach is to use an interferometric measuring principle, or, for example, a combination of a distance measurement based on the pulse-time-of-flight method and an interferometric principle.

Furthermore, the basic structure of such measuring devices comprises a tracking unit for providing an automatic adjustment of the aiming direction of the laser measuring beam such that the measuring beam is continuously tracking a target point of a moving object to be measured.

A direction of the emission of the laser measuring beam is determined by means of sensors for angle measurement, e.g. angle encoders. The target point is typically embodied as a cooperative target, e.g. a passive reflecting unit with defined reflecting properties such as a steel sphere of known dimensions or a retroreflecting unit such as a cubic prism, wherein the laser beam is reflected back, e.g. in parallel, to the measuring device. Alternatively, the cooperative target may be an active unit emitting radiation having defined emission properties and/or according to a defined radiation pattern, e.g. provided by a single or multiple laser diodes, which is identified by the tracking unit of the measuring device.

By way of example, for the purpose of continuous target tracking, a deviation of a returning tracking beam, e.g. part of the distance measuring beam or a separately emitted tracking beam, may be used to determine a deviation from a zero position on a tracking sensor. By means of this measurable deviation, the aiming direction of the tracking beam can be corrected or continuously adjusted in such a way that the deviation on the tracking sensor is reduced.

As tracking sensor, a narrow field-of-view camera or a position-sensitive detector (PSD) may be used, e.g. an area sensor which functions in an analog manner with respect to position, with the aid of which a centroid of a light distribution on the sensor surface can be determined.

In order to achieve a high level of accuracy, the visual field of a tracking detector such as a PSD is typically selected to be comparatively small, e.g. corresponding to the beam diameter of the tracking beam. Therefore, the use of such a PSD-based tracking must be preceded by a coupling of the tracking beam to the cooperative target. Thus, problems may occur when the target moves so abruptly and rapidly that the cooperative target disappears from the visual range of the PSD detector. Furthermore, coupling may be lost when the line of sight is interrupted, even in case the interruption only occurs during a brief moment.

Various principles and methods are known in order to hold the laser beam in the "coupled" state even during rapid and abrupt movements of the target object or during interruption of the laser beam.

For example, a camera may be used configured to have a comparatively wide field-of-view, i.e. configured to capture the cooperative target as well as the target carrier and a substantial part of the background. Therefore, on the basis of image processing, the track of the target object or movements of objects moving along with the target object can be determined and used to easier locate the cooperative target and to couple (re-lock) the laser beam again in the event that the cooperative target has been lost from the "coupled" state.

By way of example, computer vision algorithms are able to detect and track arbitrary objects in any normal video stream. However, such algorithms typically require a prior training based on at least some basic information on the object to be detected and/or the environment, because the appearance of the tracked object and/or the background of the tracked object may change, e.g. between different measuring sites or even on the same measuring site, e.g. in a short time because of different lighting conditions during the day or over a longer period of time because of seasonal effects. Therefore, in order to train these algorithms, extensive efforts may be required to generate positive samples from the target object and negative samples from the background.

BRIEF DESCRIPTION OF THE INVENTION

It is an object of some aspects of the present invention to provide an improved industrial or geodetic surveying device which overcomes the above mentioned problems.

In particular, it is an object of some aspects of the invention to provide an industrial or geodetic surveying device having a more efficient and more robust measuring workflow.

These objects are achieved by realizing the features of the independent claim. Features which further develop the invention in an alternative or advantageous manner are described in the dependent patent claims.

Some aspects of the invention relate to an industrial or geodetic surveying device, in particular theodolite or total station or laser tracker or laser radar, with a base and a tracking unit, which is rotatable about two axes relative to the base and defines an aiming axis. The tracking unit is configured to receive over a tracking channel a tracking signal which is indicative of a change in angular location of a cooperative target of a target carrier—e.g. a housing or support structure of the cooperative target, or a machine or person carrying the cooperative target—with respect to the surveying device; to determine the change in angular location of the cooperative target based on the tracking signal; and to generate control data for adjusting the alignment of the aiming axis based on the determined change in angular location. Furthermore, the surveying device comprises angle measuring sensors configured to generate angle data indicative of an orientation of the tracking unit with respect to the base, and a camera configured to generate image data.

For example, tracking may be based on emitting an optical tracking beam and using a position sensitive detector as tracking detector. Alternatively, or in addition, tracking may be based on other known position determining devices mounted on the surveying device and/or a target carrier, e.g. based on a global satellite positioning system or a local radio frequency positioning system. Thus, the tracking signal may be embodied as an optical tracking beam but also as any other kind of wireless transmission signal to exchange positional information between the surveying device and a target carrier.

By way of example, the camera can be configured for generating images as single exposures or as part of a videostream, wherein the images may be generated in a wavelength range chosen at least from one of the optical wavelength spectrum, the UV wavelength spectrum, and the infrared wavelength spectrum. In particular, the camera may be embodied as a panoramic camera, particularly configured to provide 360 degree panoramic image data, or the surveying device may comprise an arrangement of multiple cameras, particularly including the aforementioned camera, configured to provide panoramic image data, particularly 360 degree panoramic image data. The camera may also be configured to provide depth information, e.g. based on a RIM-detector (RIM: "ranging and imaging") or based on a range scanning arrangement.

By way of another example, the camera may be mounted such that it is co-moving with the movements of the tracking unit or it may be arranged at the base or a support structure holding a laser emission unit of the surveying device. Alternatively, the camera could even be arranged completely independent of the movements of the tracking unit.

The surveying device is configured for operation in a locked state, wherein the tracking channel is undisturbed, namely such that the tracking signal is receivable without unscheduled interruption, and the target carrier is continuously tracked based on the control data, particularly wherein the aiming axis is continuously adjusted based on the control data such that it is continuously following the cooperative target.

According to some embodiments of the invention, the surveying device is configured for generation of first image data by the camera in a locked state, and for training of a detector for the target carrier based on the first image data, in particular wherein recognition indicia indicative of the appearance of the target carrier imaged by the first image data are determined by image processing, e.g. based on an assumption of a position of a cooperative target within an image of the first image data.

Furthermore, the surveying device is configured for carrying out a backup tracking mode, wherein second image data are generated, a position of the target carrier within an image of the second image data is determined by use of the trained detector, and the aiming axis is adjusted based on the determined position of the target carrier.

For example, the backup tracking mode may be carried out to support the tracking based on the tracking signal and/or the backup tracking mode may be used as backup when the tracking channel is disturbed, e.g. to re-lock the tracking signal when the tracking channel is disturbed in such a way that continuous tracking of the target carrier is compromised by an interruption of the tracking signal.

By way of example, at least part of the second image data may be generated by the same camera which provides the first image data. Alternatively, the surveying device may comprise at least one further camera to provide at least part of the second image data.

The continuous lock onto the cooperative target makes the target carrier stay roughly at the same position in the images of the first image data, whereas the background and other untracked objects are moving. Therefore, one can make use of this knowledge about the coarse position of the target carrier in the camera images as well as about its behavior when it is moving.

Thus, according to some aspects of the invention, this additional knowledge is used to learn the visual appearance of the imaged target carrier, e.g. from all sides of the carrier in case the carrier is moving and turning, wherein the result is stored in the form of a detector for use in a backup tracking mode, e.g. when the surveying device enters an unlocked or disturbed tracking state.

By way of example, a computer vision algorithm may be used configured to analyse a series of images generated by the camera in the locked state in order to identify and/or select different objects within the images of the series of images, based on the additional knowledge about the position of the cooperative target within the camera images.

One could use difference images between the sequential images of the camera to differentiate between tracked object and background. As the camera is following each movement of the target carrier, the carrier itself always stays in a fixed position, e.g. the center, of the image. Therefore, the pixel values here are changing very slowly compared to the moving background. The area in the difference image where the changes are below a certain threshold can be segmented as positive sample, the other as negative samples. Instead of doing background subtraction another option would be to use state-of-the-art image segmentation approaches, e.g. based on hierarchical segmentation.

For example, the detector may be determined and provided with respect to a sophisticated detection algorithm configured to detect and track a target carrier within a series of images and to automatically learn and/or improve a classification model of the target carrier. In particular, the detector might be a detection model for the tracked target carrier which has been provided fully automatically by a computer vision and/or machine learning algorithm without additional interaction of any user, i.e. "from scratch".

Alternatively, training may be based on pre-defined information, e.g. knowledge about a type of target carrier. Thus, according to another embodiment, the surveying device is configured that the training of the detector is based on pre-defined information provided by a manual selection from an information database, particularly wherein the information database is stored on a local computing unit of the surveying device and/or the surveying device is configured for bi-directional communication with a remote computing unit, wherein the information database is stored on the remote computing unit. For example, a partial clone of a remote database, may be cached on the local computing unit whereby the local cache is updated only from time to time, e.g. if access to the remote computing unit is only temporarily available.

In another embodiment, pre-defined information is provided by at least one of communication with the target carrier, particularly by means of a wireless communication network and/or by receiving a coded light signal, and communication with another measuring instrument, particularly another on-site surveying device, more particularly a laser tracker.

Pre-defined information may also include essentially real-time information acquired by other surveying devices. Thus, for example, a network of surveying devices may be used, e.g. to provide in a short time information on an all around appearance of the target carrier, or wherein different surveying devices are assigned to different zones on a worksite, wherein target carriers together with corresponding appearance information are "handed over" to another surveying device when leaving the zone of a previous surveying device.

By way of another example, the pre-defined information may comprise at least one of a type of the target carrier and/or the cooperative target, an identification code of the target carrier and/or the cooperative target, i.e. a carrier ID or target ID, information indicative of the spatial arrangement of the cooperative target relative to the target carrier, and positional information for the target carrier, in particular an absolute position of the target carrier.

In another embodiment, the surveying device is configured that the training of the detector comprises an identification of the target carrier, in particular wherein based on the identification a request for auxiliary information is triggered, more particularly wherein the auxiliary information comprises at least one of a confirmation of the identification, an identification code of the target carrier and/or the cooperative target, and positional information for the target carrier, in particular an absolute position of the target carrier.

Thus, based on the identification, a dedicated pre-trained classifier specific for a carrier type or carrier ID may be manually or automatically selected and improved for the actual situation.

According to another embodiment, the surveying device is configured that a series of images generated in the locked state is provided to a training algorithm based on computer vision and machine learning, wherein the training algorithm is configured to provide as the detector a detection model for detecting the target carrier based on the series of images, and in the backup tracking mode the detection model is used to detect and locate the target carrier.

In particular, the training algorithm may be configured to provide the detection model by at least one of selecting a detection model from a list of detection models, adapting an existing detection model, e.g. by transfer learning, and generating a new detection model, e.g. by online learning.

For example, the training algorithm is based on at least one of a decision tree, in particular based on random forests, a tracking-learning-detection algorithm, a support vector machine, boosting, deep learning, in particular based on a neural network, particularly a convolutional neural network or a recursive convolutional neural network, learning vector quantization, and consensus based matching and tracking.

In a further embodiment, the tracking unit comprises a transmitter configured to emit a tracking beam defining a tracking axis, the tracking axis having a fixed orientation with respect to the aiming axis, particularly wherein the tracking axis is parallel or coaxial with respect to the aiming axis; and a tracking detector configured to receive at least part of the tracking beam returning from the cooperative target to generate tracking data being indicative of alignment of the cooperative target with respect to the tracking beam, in particular wherein the tracking detector has a tracking field of view which is smaller than the camera field of view.

By using also distance data indicative of a distance between the surveying device and the target carrier, segmentation robustness may be improved, e.g. thanks to a more accurate size estimation for the imaged target carrier. Thus, in another embodiment, the surveying device is configured that the training of the detector is based on a distance to the target carrier.

For example, the surveying device comprises an optoelectronic distance meter configured to determine a distance to the cooperative target based on a laser distance measuring beam, e.g. wherein distance measurement is based on at least one of a pulse time-of-flight method, a phase measuring method, an interferometric distance measuring principle, particularly a frequency modulated continuous wave method (FMCW, particularly C-FMCW), the Fizeau principle, and a Frequency comb principle.

Furthermore, a search and re-lock based on the backup tracking mode may be sped up in case the position of the cooperative target in relation to the target carrier is known. Therefore, according to another embodiment, the surveying device is configured that, based on a series of images of the first image data, an arrangement parameter indicative of the spatial arrangement of the cooperative target relative to the target carrier is determined, and that the aiming axis is adjusted based on the arrangement parameter.

In case the background is known, e.g. from a partial panorama, detection of multiple moving targets can be sped up and the robustness of image segmentation is improved. In particular, a background subtraction of the partial panorama image can be further improved in case time information is available indicating the time of image generation by the camera. For example, such time information may be used to consider the change of the lighting in the scene, e.g. during the day due to different positions and strengths of the sun, or the time information may serve to generate different long-term background models, e.g. considering seasonal changes in the background.

Thus, in a further embodiment the surveying device is configured that in the locked state a series of images is generated by the camera; alignment data indicative of a current viewing direction of the camera are assigned to the series of images; a background model is generated by a computer vision algorithm, based on identifying in the series of images segments representing environment objects without proper motion, wherein the background model is referencable with respect to a current alignment of the aiming axis; and in the backup tracking mode the position of the target carrier within the image of the second image data is determined by taking into account the background model.

In another embodiment, the surveying device is configured that a time and/or date is assigned to the series of images, and the background model is stored as a time-referenced background model in a background model database, wherein in the backup tracking mode the position of the target carrier within the image of the second image data is determined based on a background model selected from the background model database.

Some embodiments of the invention further relate to a computer program product comprising program code which is stored on a machine-readable medium, or being embodied by an electromagnetic wave comprising a program code segment, and having computer-executable instructions for performing, particularly when run on a computing unit of a surveying device as described above, at least the following steps: generation of first image data by a camera in a locked state of a surveying device, training of a detector for a target carrier based on the first image data, in particular wherein recognition indicia indicative of the appearance of the target carrier imaged by the first image data are determined by image processing, generation of second image data, determination of a position of the target carrier within an image of the second image data by use of the trained detector, and adjusting the aiming axis based on the determined position of the target carrier.

BRIEF DESCRIPTION OF THE DRAWINGS

The surveying device according to some aspects of the invention is described or explained in more detail below, purely by way of example, with reference to working examples shown schematically in the drawing. Identical elements are labelled with the same reference numerals in the figures. The described embodiments are generally not shown true to scale and they are also not to be interpreted as limiting the invention. Specifically.

DETAILED DESCRIPTION

Figure 1:
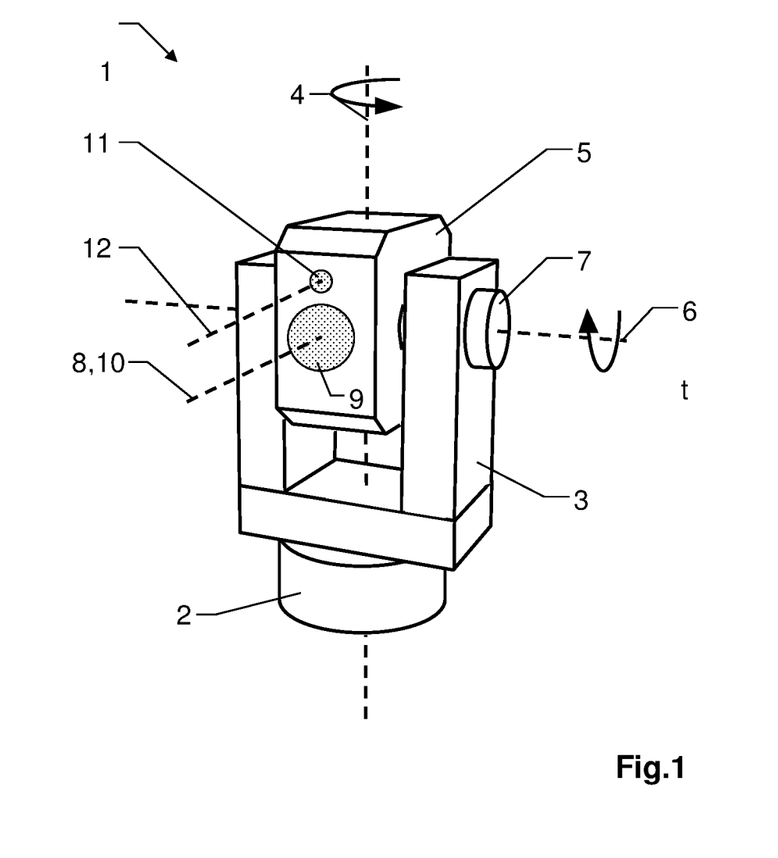
FIG. 1: exemplarily illustrates the basic structural elements of an industrial or geodetic surveying device according to the invention.

FIG. 1 exemplarily illustrates the basic structural elements of an industrial or geodetic surveying device 1 according to the invention in a frontal view. The surveying device comprises a base 2, which is mountable onto a holding apparatus, e.g. in the form of a tripod stand (not shown, see FIG. 2). A support structure 3 is fitted on the base 2 in a manner mounted rotatably about the vertical axis 4, wherein the support structure 3 holds an aiming structure 5 mounted tiltably about the horizontal axis 6. Both the support structure 3 and the aiming structure 5 are rotatable in a motorized fashion, e.g. by means of a motorized shaft 7, wherein the orientations of the support structure 3 and the aiming structure 5 may be determined by corresponding angle encoders (not shown).

Figure 2:
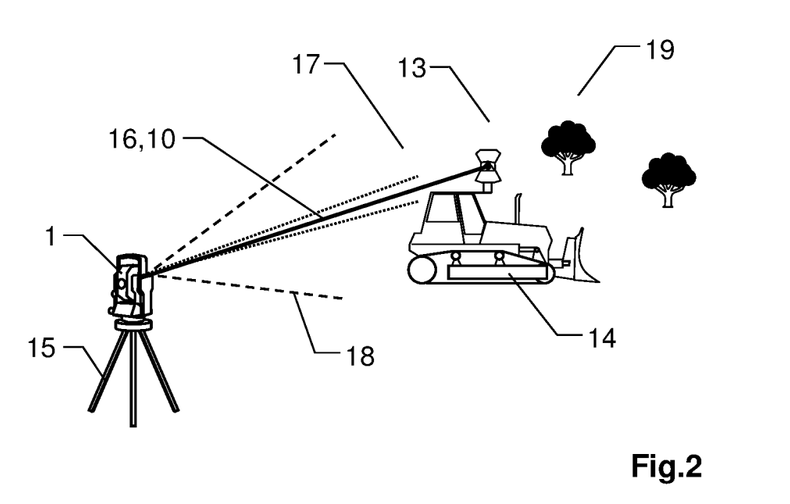
FIG. 2: an exemplary use case of an inventive surveying device on a construction site.

The aiming structure 5 is configured to emit a laser measurement beam along an aiming axis 8 towards a target object (not shown, see FIG. 2). By way of example, the objective lens 9 is the same for the transmission and the reception channel of the measurement beam. The aiming structure 5 houses an opto-electronic distance meter configured to determine a distance to a, particularly cooperative, target of a target carrier based on at least part of the measurement beam returning from the cooperative target. By way of example, parts of the opto-electronic distance meter, e.g. the beam source, may also be arranged in the support structure 3, wherein a fiber based optical waveguide system connects the elements integrated in the support structure 3 through the shaft 7 into the aiming structure 5.

Furthermore, the aiming structure 5 is configured to emit a tracking beam defining a tracking axis 10. The tracking axis 10 has a fixed orientation with respect to the aiming axis 8, e.g. wherein the tracking axis is coaxial with respect to the aiming axis 8 and is emitted through the same objective lens 9 as shown in the figure. Returning parts of the tracking beam are detected by a tracking detector, e.g. a position sensitive detector configured to determine a centroid of a light distribution on the sensor surface, in order to determine a deviation from a zero position. Thus, tracking data are generated which are indicative of an alignment of the cooperative target with the tracking axis 9.

In order to achieve a high level of accuracy, the visual field of a tracking detector such as a PSD may be selected comparatively small, e.g. corresponding to the beam diameter of the tracking beam. However, in order to track fast target objects the tracking beam diameter or divergence angle may be enlarged, i.e. on the cost of achievable pointing accuracy of the measuring beam.

Typically, tracking must be preceded by a coupling of the tracking beam to the cooperative target, wherein tracking may be interrupted in case of an abrupt and rapid movement of the target or when the line of sight is interrupted. Given the comparatively small field-of-view of the tracking detector, this may lead to a complete failure of the tracking, even in case the interruption only occurs during a brief moment.

Therefore, in order to maintain tracking even during rapid and abrupt movements of the target carrier or during interruption of the laser beam and/or to quickly re-couple the tracking beam to the cooperative target, a camera 11 may be used configured to have a fixed, i.e. known, relative viewing direction 12 with respect to the aiming axis 8 and a comparatively wide field-of-view, i.e. configured to capture the target carrier as well as a substantial part of the background, e.g. as shown by FIG. 2. Therefore, on the basis of image processing, e.g. using computer vision algorithms, the position and/or track of the target carrier can be determined and used to easier re-lock the tracking beam.

FIG. 2 shows an exemplary use case of an inventive surveying device 1 on a construction site, wherein a cooperative target 13, e.g. a retro-reflecting prism, is mounted on a construction machine 14. For example, the construction machine 14 may be a bulldozer used for levelling a terrain for road or building construction, wherein the working steps of the bulldozer and the geometric state of the terrain relative to the bulldozer are monitored and/or controlled by means of the surveying device 1. Here, the surveying device 1 is mounted on a tripod 15 and may be repositioned on the construction site, wherein the surveying device is typically configured to be referenced to an outer coordinate system, e.g. by a dedicated calibration procedure. In other applications, e.g. in process monitoring in a construction hall, the surveying device may be fixedly installed.

Here, the surveying device 1 comprises a tracking unit configured to track the cooperative target 13 by means of a tracking beam 16, the tracking beam 16 being emitted along a tracking axis 10, wherein the tracking axis and the aiming axis 8 (FIG. 1) of a measuring beam used for a distance measurement have a fixed orientation with respect to each other. At least part of the tracking beam 16 returning from the cooperative target 13 is detected by a tracking detector configured to generate tracking data being indicative of an alignment of the tracking beam 16 with respect to the cooperative target 13.

By way of example, a narrow field-of-view camera or a position-sensitive detector (PSD) may be used as tracking detector, e.g. an area sensor which functions in an analog manner with respect to position, with the aid of which a centroid of a light distribution on the sensor surface can be determined. In order to achieve a high level of accuracy, the visual field 17 of such a PSD is typically selected to be small.

Typically, tracking must be preceded by a coupling of the tracking beam 16 to the cooperative target 13, i.e. the surveying device 1 is locked to the target, wherein the target carrier 14, particularly the cooperative target 13, can be continuously tracked based on the control data without unscheduled interruption of the tracking beam 16.

However, during the movement of the bulldozer 14, the line of sight to the cooperative target 13 may be blocked by an object of the environment or by the bulldozer itself, or the tracking beam 16 may be otherwise compromised, e.g. by disturbing reflections from the cooperative target 13. Even in case this disturbance only occurs during a brief moment, the cooperative target 13 may have moved outside the field of view 17 of the PSD, and further object tracking may require to re-couple the tracking beam 16 onto the cooperative target 13.

Therefore, a camera 11 (FIG. 1) is used configured to have a known, e.g. fixed, relative viewing direction 12 with respect to the aiming axis and the tracking beam 16, wherein the camera 11 has a comparatively wide field-of-view 18, i.e. configured to capture the target carrier 14 as well as a substantial part of the background 19, e.g. surrounding buildings and trees. Therefore, on the basis of image processing, e.g. using computer vision algorithms, the position and/or track of the bulldozer 14 can be determined and used to easier re-lock the tracking beam 16.

Figure 3:
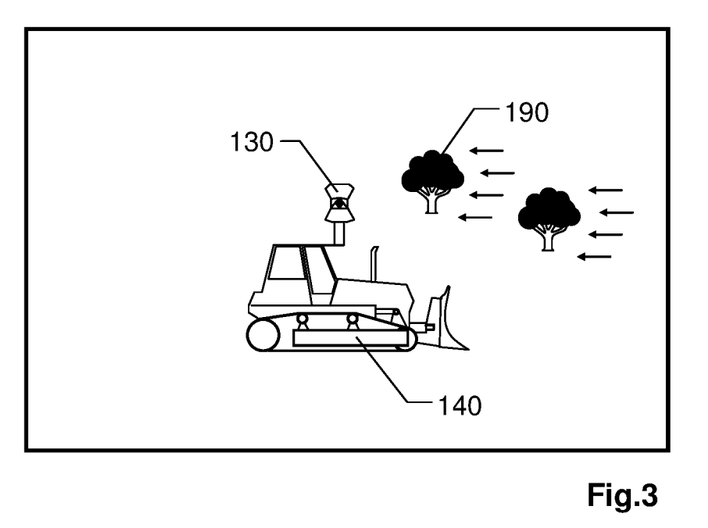
FIG. 3: an exemplary image by the camera of the inventive surveying device, captured in a locked state of the surveying device.

FIG. 3 shows an exemplary image by the camera of the inventive surveying device captured in the locked state of the surveying device, comprising an image of the target carrier image, and an image of the cooperative target 130, as well as an image of background objects 190.

On the one hand, because of the fixed viewing direction of the camera with respect to the tracking axis, the position of the image of the cooperative target 130 within the camera image is fixed, and, when generating a series of images by the camera, the target carrier image 140 essentially stays in a defined area within these camera images, here approximately in the center of each camera image.

On the other hand, in a series of camera images an image of a background object 190, i.e. an object without proper motion or an object that is not tracked, is moving relative to the position of the target carrier image 140.

According to the invention, once the surveying device is in the locked state, based on the additional knowledge about the position of the cooperative target image 130 within the camera image, the visual appearance of the target carrier 13 (FIG. 2) is learned and stored in the form of a detector for use in a backup tracking mode, e.g. when the surveying device 1 enters an unlocked state.

In particular, when generating a series of images in the locked state while the target carrier 13 moves, in the images the imaged target carrier is essentially turning and changing its relative size, i.e. when moving towards or away from the surveying device 1. Therefore, the visual appearance of the target carrier 13 with respect to different relative point of views of the surveying device 1 onto the target carrier 13 can be learned on the fly.

Figure 4A:
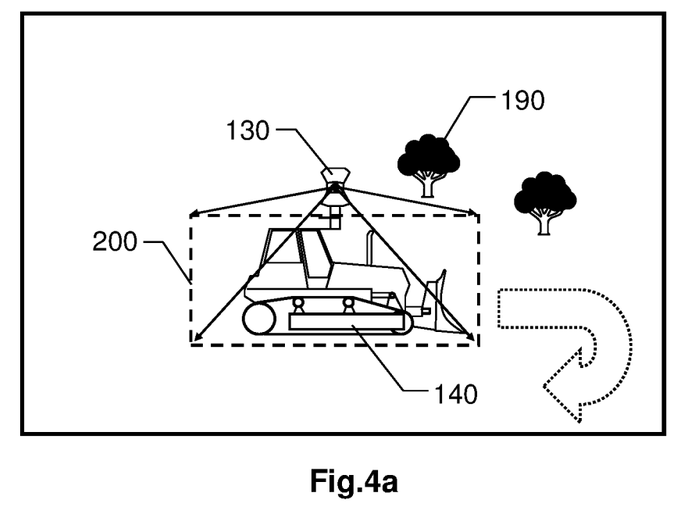
FIG. 4a,b: two exemplary images of a series of images generated by the camera during the locked state.
Figure 4B:
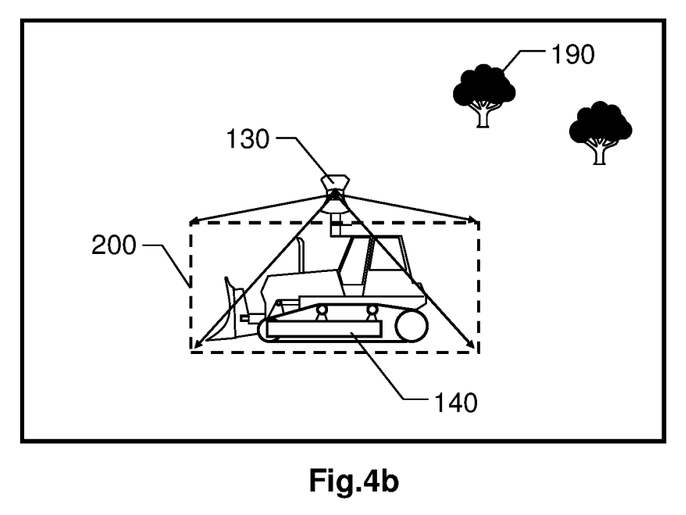

FIGS. 4a and 4b show two exemplary images of a series of images generated by the camera during the locked state, wherein the image illustrated by FIG. 4a has been generated earlier than the image illustrated by FIG. 4b. Both images comprise a target carrier image 140, and a cooperative target image 130, as well as an image of background objects 190, wherein in FIG. 4a also the movement of the target carrier 14 is illustrated by a dotted arrow.

Because of the fixed viewing direction of the camera with respect to the tracking axis, the images of the target carrier 140 stay within a common imaging area 200, wherein in each image the common imaging area 200 is defined by the position of the cooperative target image 130, which is essentially the same for all images of the series of images.

Therefore, by way of example, a computer vision algorithm may be used configured to analyse an image stream generated based on the common imaging area 200 in each image of the series of images. In other words, identification and/or selection of different objects within the images of the series of images can be carried out based on the additional knowledge about the position of the cooperative target image 130 within the camera images. After successful selection (or segmentation) of objects of interest within the images, the selected areas, e.g. comprising the target carrier image 140 and/or images of background objects 190 can be fed into another algorithm which automatically learns the appearance of the tracked carrier for later use.

In particular, any known algorithm configured to detect and track a target object within a series of images and to automatically learn and/or improve a classification model of the target object may be used. For example, a classifier can be trained with positive samples from the target object and negative samples from the background. This way the classifier for the tracked object can be provided fully automatically by a computer vision/machine learning algorithm without additional interaction of any user. Thus, the model itself can be learned automatically "from scratch" or it could be manually or automatically selected from a database of pre-trained models. Once a model exists it can also be refined or customized automatically while the target carrier is reliably tracked in the locked state of the surveying device.

In case a new classification model is trained or an existing model is improved, update information could optionally also be transferred to a central database, e.g. which is hosted in a data cloud of a company, wherein the updated model in this database may then be used to serve as starting point (a pre-trained model) for other users.

Furthermore, alignment data indicative of actual viewing directions of the camera can be assigned to the series of images in order to collect at least partial panoramic information about the background of the scene. A panoramic background model may then be generated which is referencable with respect to a current alignment of the aiming axis. Using difference images between such a referencable panoramic background and current image content can then improve segmentation of images into areas representing different objects. For example, re-detection of the cooperative target in the unlocked state can be sped up this way, as only the differences to the known background must be analyzed by the classifier.

Figure 5A:
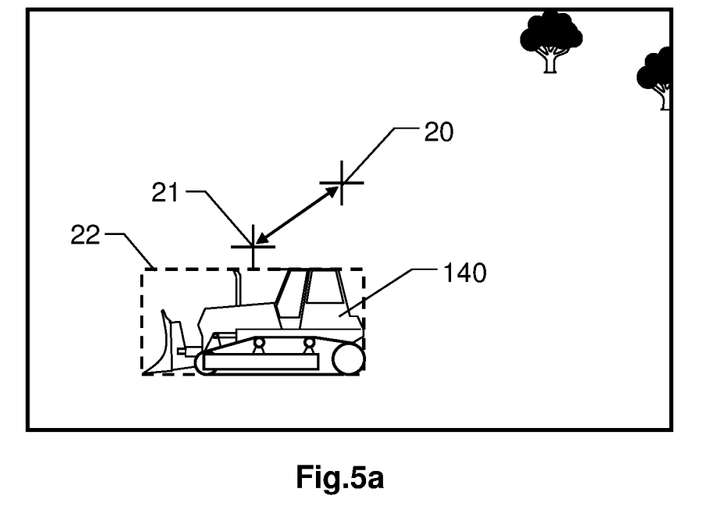
FIG. 5a,b: exemplary images generated by the camera in the backup tracking mode during the unlocked state.
Figure 5B:
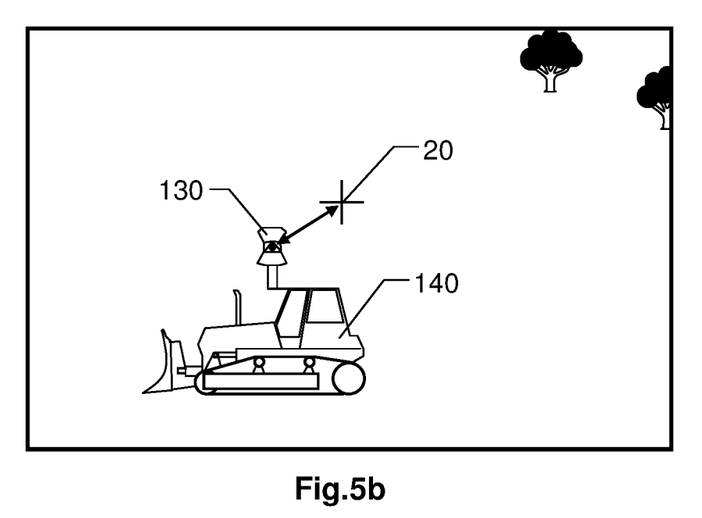

FIGS. 5a and 5b show two exemplary images generated by the camera in the backup tracking mode during an unlocked state, wherein for illustration of the lost coupling of the surveying device 1 (FIG. 2) to the target carrier 14, a nominal position 20 of the cooperative target image 130 in the locked state is indicated.

According to the invention, the position of the target carrier image 140 is recognized by the detector trained in the locked state, i.e. based on the learned visual appearance of the target carrier when captured from different point of views of the camera.

For example, detection of the target object within the camera image may be based on a TLD algorithm (TLD: "tracking-learning-detection") based on positive image samples for the target carrier and negative image samples for the background.

FIG. 5a shows the case wherein the arrangement of the cooperative target 13 (FIG. 2) relative to the target carrier 14 is not known or not yet determined. In this case, an adjustment parameter for adjusting the current direction of the aiming axis 8 may be determined based on an assumed general position 21 with respect to a determined area 22 selected to be indicative of the position of the target carrier image 140, e.g. wherein a general overall orientation of the target carrier is assumed.

In an improved setting, the surveying device 1 may be configured that, in the locked state, an arrangement parameter indicative of the spatial arrangement of the cooperative target 13 relative to the target carrier 14 is determined based on image processing and the knowledge about the position of the cooperative target image 130 within the camera image.

Alternatively, or in addition, information about the arrangement of the cooperative target 13 on the target carrier 14 may be provided manually or automatically to the surveying device 1, e.g. wherein the surveying device is configured to receive a wireless communication signal from the target.

Therefore, as illustrated by FIG. 5b, an improved adjustment parameter for adjusting the current direction of the aiming axis 8 may be determined based on a determined position and orientation of the target carrier 14 as well as the known arrangement of the cooperative target 13 with respect to the target carrier 14.

Figure 6:
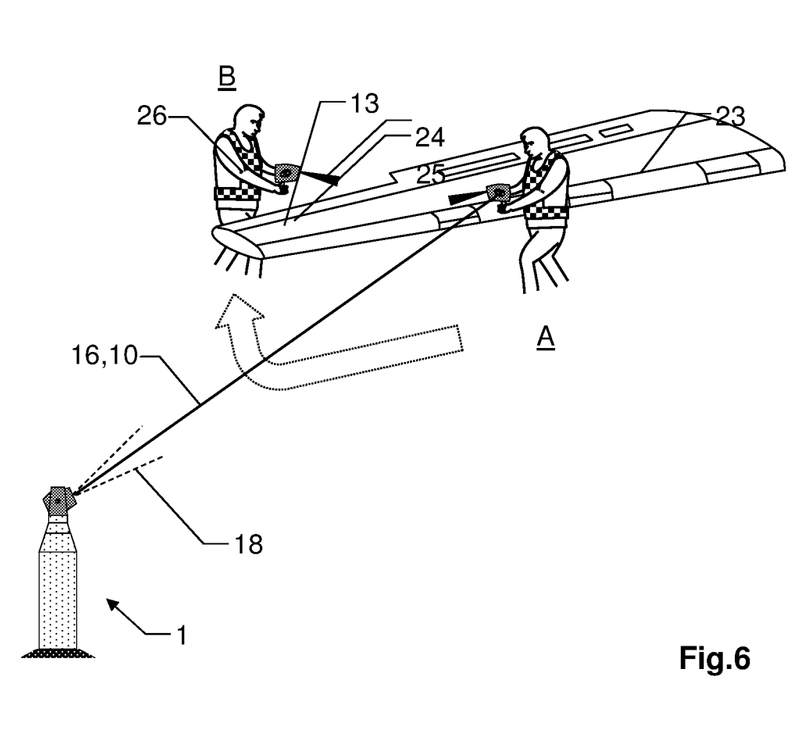
FIG. 6: an exemplary use case of an inventive surveying device in the field of industrial metrology.

FIG. 6 shows an exemplary use case of an inventive surveying device 1 in the field of industrial metrology, e.g. measuring and quality control of workpieces in industrial automobile or aircraft production.

A typical metrology measurement system for determining 3D coordinates of an object 23 comprises a laser tracker 1 and a mobile measuring device 24 configured to carry out a tactile and/or laser based measurement of the object to be measured 23. Attached to the mobile measuring device 24 is a cooperative target 13, e.g. a retro-reflecting prism.

For example, the mobile measuring device 24 may be configured as a hand-held scanner or may be mounted on a motorized movable articulated arm or a robot, e.g. UAV ("unmanned aerial vehicle"). Typically, the mobile measuring device 24 has to be brought close to the object surface, e.g. less than a meter.

The laser tracker 1 is installed in a construction hall, e.g. at a fixed referencable position in the construction hall. Again, the laser tracker 1 comprises a tracking unit configured to track the cooperative target 13, e.g. by means of a tracking beam 16, wherein the tracking beam 16 is emitted along a tracking axis 10 and at least part of the tracking beam 16 returning from the cooperative target 13 is detected by a tracking detector of the laser tracker 1.

Furthermore, the mobile measuring device 24 may have some markers (not shown) for pose determination and the laser tracker 1 may have an orientation camera (not shown), wherein the laser tracker 1 is configured to determine a 6DoF pose (6 degrees of freedom, i.e. position and orientation) of the mobile measuring device 24 by means of image processing. Often, the mobile measuring device 24 also has additional pose determination means, e.g. an inertial measuring unit, and is configured for wireless communication with the laser tracker 1.

In the figure, the mobile measuring device 24 is embodied as a handheld scanner configured to emit a local scanning beam 25 in order to scan the object surface in a local coordinate system, wherein the position of the mobile measuring device 24 is tracked and measured by the laser tracker 1 by means of the tracking beam 16. Thus, the measuring points of the mobile measuring device 24 are referencable to an outer coordinate system, e.g. the coordinate system of the laser tracker 1.

Particularly in case of large objects to be measured, e.g. overhanging aircraft components in a production hall, a worker 26 carrying the mobile measuring device 24 may need to take different measurement positions A,B, e.g. walk around the object to be measured 23 as indicated in the figure. This may lead to some interruptions of the tracking channel, e.g. when the tracking channel is blocked by the worker 26 itself when he is turning around.

In addition, many different workers may work on the same object to be measured. If two workers cross each other the tracking beam related to the worker in the background is blocked by the person in front. In such cases, the laser tracker may carry out a so called power-lock procedure, e.g. an automatic scanning of the tracking beam in a pre-defined scan pattern to find a cooperative target, to automatically re-lock the tracking beam to a cooperative target. However, since typical power-lock procedures only scan in a quite narrow searching field of view, it may happen that instead of re-locking the tracking beam onto the mobile measuring device of the worker in the background the tracking beam is falsely locked onto the mobile measuring device of the worker in front. In the extreme case, the laser tracker may not even notice this wrong re-lock and thus continue to track the wrong worker.

In many cases, the worker may also need to stow the mobile measuring device for repositioning, e.g. to securely climb a ladder to reach the next scanning position. In this case, a camera may be used to track the position of the worker as a coarse position of the mobile measuring device, e.g. by way of a computer vision algorithm to detect and track the worker in a video stream generated by the camera, in order to enable a quick re-lock of the tracking beam onto the cooperative target of the mobile measuring device as soon as the worker has reached the next scanning position.

However, without dedicated training computer vision algorithms for person tracking are typically laid out for the case of tracking a clearly identifiable person in front of a rather homogeneous background. In a construction hall these prerequisites are not satisfied. In contrast, the background is highly structured and constantly changing, wherein workers often wear the same or quite similar clothing. Therefore, person tracking by computer vision algorithms may often fail in an environment such as a construction hall.

Therefore, according to the invention, a camera 11 (FIG. 1) is used, e.g. having a fixed relative viewing direction with respect to the tracking beam 16, wherein the camera 11 has a comparatively wide field-of-view 18, i.e. the camera is configured to capture at least part of the worker 26 carrying the mobile measuring device 24 as well as a substantial part of the background. Once the laser tracker 1 is in the locked state, based on the additional knowledge about the position of the cooperative target image within the camera image, the visual appearance of the worker 26 is learned and stored in the form of a detector for use in a computer vision backup tracking mode.

For example, the backup tracking mode may then be used as consistency check for the tracking unit, e.g. to support a power-lock procedure and/or to verify that the correct cooperative target is tracked after a power-lock procedure has been carried out.

In particular, the backup tracking mode may be active during all the measuring campaign or the backup tracking mode may only be invoked in case the tracking beam is blocked, e.g. when the worker stows the mobile measuring device for repositioning.

Although the invention is illustrated above, partly with reference to some preferred embodiments, it must be understood that numerous modifications and combinations of different features of the embodiments can be made. All of these modifications lie within the scope of the appended claims

What is claimed is:

1. An industrial or geodetic surveying device comprising:
a base;
a tracking unit, which is rotatable about two axes relative to the base and defines an aiming axis, the tracking unit being configured to:
receive over a tracking channel a tracking signal which is indicative of a change in angular location of a cooperative target of a target carrier with respect to the industrial or geodetic surveying device,
to determine the change in angular location of the cooperative target based on the tracking signal, and
to generate control data for adjusting an alignment of the aiming axis based on the determined change in angular location,
angle measuring sensors configured to generate angle data indicative of an orientation of the tracking unit with respect to the base; and
a camera configured to generate image data,
wherein the industrial or geodetic surveying device is configured for operation in a locked state, wherein the tracking channel is undisturbed, namely such that the tracking signal is receivable without unscheduled interruption, and the target carrier is continuously tracked based on the control data,
wherein the industrial or geodetic surveying device is configured to:
generate a series of images by the camera in the locked state and provide the series of images to a training algorithm based on computer vision and/or machine learning, wherein each image of the series of images comprises an image of the cooperative target and an image of the target carrier,
train a detector for the target carrier, wherein the training algorithm is configured to provide as the detector a detection model for detecting the target carrier by
assigning a common imaging area to the images of the series of images by making use of a known position of the image of the cooperative target provided by the locked state, wherein the common imaging area provides an estimated position of the image of the target carrier relative to the known position of the image of the cooperative target, and
analyzing the common imaging area of the series of images and, based thereof, learning on the fly recognition indicia indicative of a visual appearance of the target carrier with respect to different relative point of views of the surveying device onto the target carrier, and
perform a backup tracking mode, wherein
image data is generated,
a position of the target carrier within an image of the image data is determined by finding the image of the target carrier within the image data using the trained detection model to detect and locate the target carrier, and
the aiming axis is adjusted based on the determined position of the target carrier.

2. The industrial or geodetic surveying device according to claim 1, wherein the tracking unit comprises:
a transmitter configured to emit a tracking beam defining a tracking axis, the tracking axis having a fixed orientation with respect to the aiming axis, and
a tracking detector configured to receive at least part of the tracking beam returning from the cooperative target to generate tracking data being indicative of an alignment of the cooperative target with respect to the tracking beam.

3. The industrial or geodetic surveying device according to claim 1, wherein the industrial or geodetic surveying device is configured that the training of the detector is based on a distance to the target carrier.

4. The industrial or geodetic surveying device according to claim 3, wherein the industrial or geodetic surveying device comprises an opto-electronic distance meter configured to determine a distance to the cooperative target based on a laser distance measuring beam.

5. The industrial or geodetic surveying device according to claim 1, wherein:
the camera is embodied as a panoramic camera, or
the industrial or geodetic surveying device comprises an arrangement of multiple cameras.

6. The industrial or geodetic surveying device according to claim 1, wherein the industrial or geodetic surveying device is configured that, based on the series of images, an arrangement parameter indicative of a spatial arrangement of the cooperative target relative to the target carrier is determined, and that the aiming axis is adjusted based on the arrangement parameter.

7. The industrial or geodetic surveying device according to claim 1, wherein the industrial or geodetic surveying device is configured that the training of the detector is based on pre-defined information provided by at least one of:
a manual selection from an information database,
communication with the target carrier, and
communication with another measuring instrument.

8. The industrial or geodetic surveying device according to claim 7, wherein the pre-defined information comprises at least one of:
a type of the target carrier or the cooperative target,
an identification code of the target carrier or the cooperative target,
information indicative of a spatial arrangement of the cooperative target relative to the target carrier, and
positional information for the target carrier.

9. The industrial or geodetic surveying device according to claim 1, wherein the industrial or geodetic surveying device is configured that the training of the detector comprises an identification of the target carrier.

10. The industrial or geodetic surveying device according to claim 1, the industrial or geodetic surveying device is configured such that:

alignment data indicative of a current viewing direction of the camera are assigned to the series of images, a background model is generated by a computer vision algorithm, based on identifying in the series of images segments representing environment objects without proper motion, wherein the background model is referenceable with respect to a current alignment of the aiming axis, and in the backup tracking mode the position of the target carrier within the image of the image data is determined by taking into account the background model.

11. The industrial or geodetic surveying device according to claim 10, wherein the industrial or geodetic surveying device is configured that:

a time or date is assigned to the series of images, and the background model is stored as a time-referenced background model in a background model database, wherein in the backup tracking mode the position of the target carrier within the image of the image data is determined based on a background model selected from the background model database.

12. The industrial or geodetic surveying device according to claim 1, wherein the training algorithm is configured to provide the detection model by at least one of:

selecting a detection model from a list of detection models, adapting an existing detection model, and generating a new detection model.

13. The industrial or geodetic surveying device according to claim 1, wherein the training algorithm is based on at least one of:

a decision tree, a tracking-learning-detection algorithm, a support vector machine, boosting, deep learning, in particular based on a neural network, learning vector quantization, and consensus based matching and tracking.

14. A computer program product comprising a non-transitory machine-readable medium having computer-executable instructions stored thereon that when executed by a computer cause performance of a method comprising:

generating a series of images by a camera in a locked state of an industrial or geodetic surveying device and providing the series of images to a training algorithm based on computer vision and/or machine learning, wherein each image of the series of images comprises an image of a cooperative target and an image of a target carrier, training a detector for the target carrier, wherein the training algorithm is configured to provide as the detector a detection model for detecting the target carrier by assigning a common imaging area to the images of the series of images by making use of a known position of the image of the cooperative target provided by the locked state, wherein the common imaging area provides an estimated position of the image of the target carrier relative to the known position of the image of the cooperative target, and training a detector for the target carrier by analyzing the common imaging area of the series of images and, based thereof, learning recognition indicia indicative of a visual appearance of the target carrier with respect to different relative point of views of the surveying device onto the target carrier, generating image data, determining a position of the target carrier within an image of the image data by finding the image of the target carrier within the image data using the trained detection model to detect and locate the target carrier, and adjusting an aiming axis based on the determined position of the target carrier.

* * * * *